US008612435B2

(12) United States Patent
Sambrani et al.

(10) Patent No.: US 8,612,435 B2
(45) Date of Patent: Dec. 17, 2013

(54) ACTIVITY BASED USERS' INTERESTS MODELING FOR DETERMINING CONTENT RELEVANCE

(75) Inventors: Hemanth Sambrani, Karnataka (IN); Rohan Monga, Punjab (IN); Sudharsan Vasudevan, Tamil Nadu (IN); Sanjeev Gupta, Punjab (IN)

(73) Assignee: Yahoo! Inc., Sunnyvale, CA (US)

( * ) Notice: Subject to any disclaimer, the term of this patent is extended or adjusted under 35 U.S.C. 154(b) by 549 days.

(21) Appl. No.: 12/504,527

(22) Filed: Jul. 16, 2009

(65) Prior Publication Data
US 2011/0016121 A1    Jan. 20, 2011

(51) Int. Cl.
*G06F 7/06* (2006.01)

(52) U.S. Cl.
USPC ............................ 707/734; 707/748; 707/751

(58) Field of Classification Search
None
See application file for complete search history.

(56) References Cited

U.S. PATENT DOCUMENTS

| | | | |
|---|---|---|---|
| 5,446,891 A * | 8/1995 | Kaplan et al. ........................ 1/1 |
| 5,727,129 A * | 3/1998 | Barrett et al. ................... 706/10 |
| 5,754,938 A * | 5/1998 | Herz et al. ..................... 725/116 |
| 5,754,939 A * | 5/1998 | Herz et al. .................... 455/3.04 |
| 5,761,662 A * | 6/1998 | Dasan .................................. 1/1 |
| 5,835,087 A * | 11/1998 | Herz et al. .................... 715/810 |
| 5,890,152 A * | 3/1999 | Rapaport et al. ...................... 1/1 |
| 5,918,014 A * | 6/1999 | Robinson ...................... 709/219 |
| 5,937,397 A * | 8/1999 | Callaghan ...................... 706/10 |
| 5,937,422 A | 8/1999 | Nelson et al. |
| 6,029,195 A * | 2/2000 | Herz ............................. 725/116 |
| 6,092,049 A * | 7/2000 | Chislenko et al. ............ 705/7.29 |
| 6,128,663 A | 10/2000 | Thomas |
| 6,134,532 A * | 10/2000 | Lazarus et al. .............. 705/14.25 |
| 6,202,058 B1 * | 3/2001 | Rose et al. ....................... 706/45 |
| 6,438,579 B1 * | 8/2002 | Hosken ......................... 709/203 |
| 6,665,653 B1 | 12/2003 | Heckerman et al. |
| 6,728,706 B2 * | 4/2004 | Aggarwal et al. ..................... 1/1 |
| 6,947,922 B1 | 9/2005 | Glance |
| 7,013,238 B1 | 3/2006 | Weare |
| 7,035,825 B1 | 4/2006 | Sturtevant et al. |
| 7,050,992 B1 * | 5/2006 | Bowman et al. ............. 705/26.3 |
| 7,117,208 B2 | 10/2006 | Tamayo et al. |

(Continued)

OTHER PUBLICATIONS

International Searching Authority, "International Search Report for PCT and Written Opinion," Application No. PCT/US2010/041960, Applicant: Yahoo! Inc., Dated Feb. 18, 2011, 9 pages.

(Continued)

*Primary Examiner* — Hung Q Pham
*Assistant Examiner* — Hubert Cheung
(74) *Attorney, Agent, or Firm* — Hickman Palermo Truong Becker Bingham Wong LLP

(57) ABSTRACT

A method and apparatus for activity-based users' interests modeling for determining relevance of the content distributed to the users is provided. Modeling of the user's interests starts by collecting information about the actions that the user performed and about the contents that were associated with the actions. That information may be used to determine how much interest the user has had in the individual subjects up to date, and to determine which subjects became more or less important to the user over time. Further processing of the information about the interests of each of the individual users in a group of users may produce characteristics indicating the interests of the group as a whole. Additional processing may generate the information reflecting relative importance of the interests of an individual user in the group to the interests of other users in the same group.

16 Claims, 4 Drawing Sheets

(56) References Cited

U.S. PATENT DOCUMENTS

| | | | |
|---|---|---|---|
| 7,203,909 | B1 | 4/2007 | Horvitz et al. |
| 7,472,102 | B1 | 12/2008 | Heckerman et al. |
| 7,478,035 | B1* | 1/2009 | Wrench et al. ............ 704/7 |
| 7,493,329 | B2 | 2/2009 | McMullen et al. |
| 7,584,165 | B2 | 9/2009 | Buchan |
| 7,590,616 | B2 | 9/2009 | Guan et al. |
| 7,594,189 | B1 | 9/2009 | Walker et al. |
| 7,630,986 | B1 | 12/2009 | Herz et al. |
| 7,739,280 | B2* | 6/2010 | Aravamudan et al. ........ 707/734 |
| 7,801,891 | B2* | 9/2010 | Hu et al. ............ 707/734 |
| 7,809,470 | B2 | 10/2010 | Shoenfeld |
| 7,827,183 | B2 | 11/2010 | Fraser et al. |
| 7,835,998 | B2* | 11/2010 | Aravamudan et al. ........ 706/11 |
| 7,885,904 | B2* | 2/2011 | Aravamudan et al. ........ 706/11 |
| 7,890,549 | B2 | 2/2011 | Elad et al. |
| 7,970,762 | B2* | 6/2011 | Goronzy et al. ............ 707/732 |
| 7,984,004 | B2* | 7/2011 | Andrew et al. ............ 706/45 |
| 8,005,833 | B2* | 8/2011 | Adar et al. ............ 707/734 |
| 8,037,067 | B1* | 10/2011 | Schnedler et al. ............ 707/734 |
| 8,055,663 | B2* | 11/2011 | Tsai et al. ............ 707/749 |
| 8,301,623 | B2* | 10/2012 | Chakrabarti et al. ........ 707/723 |
| 8,316,020 | B1* | 11/2012 | Kleinmann ............ 707/734 |
| 2002/0013782 | A1 | 1/2002 | Ostroff et al. |
| 2002/0062247 | A1* | 5/2002 | Allen ............ 705/14 |
| 2002/0178057 | A1 | 11/2002 | Bertram et al. |
| 2003/0040850 | A1 | 2/2003 | Najmi et al. |
| 2003/0061239 | A1 | 3/2003 | Yoon |
| 2003/0105682 | A1 | 6/2003 | Dicker et al. |
| 2003/0110181 | A1* | 6/2003 | Schuetze et al. ......... 707/103 R |
| 2004/0044571 | A1 | 3/2004 | Bronnimann et al. |
| 2004/0254911 | A1 | 12/2004 | Grasso et al. |
| 2005/0096949 | A1 | 5/2005 | Aiber et al. |
| 2005/0154746 | A1 | 7/2005 | Liu et al. |
| 2005/0182589 | A1 | 8/2005 | Smocha et al. |
| 2005/0193335 | A1 | 9/2005 | Dorai et al. |
| 2005/0235030 | A1 | 10/2005 | Lauckhart et al. |
| 2005/0256694 | A1 | 11/2005 | Taylor |
| 2005/0267973 | A1 | 12/2005 | Carlson et al. |
| 2006/0010029 | A1 | 1/2006 | Gross |
| 2006/0026048 | A1 | 2/2006 | Kolawa et al. |
| 2006/0041548 | A1 | 2/2006 | Parsons et al. |
| 2006/0053065 | A1* | 3/2006 | Bowman et al. ............ 705/26 |
| 2006/0106847 | A1 | 5/2006 | Eckardt et al. |
| 2006/0129926 | A1 | 6/2006 | Malek et al. |
| 2006/0149710 | A1* | 7/2006 | Koningstein et al. ............ 707/3 |
| 2007/0006177 | A1 | 1/2007 | Aiber et al. |
| 2007/0033531 | A1 | 2/2007 | Marsh |
| 2007/0088852 | A1 | 4/2007 | Levkovitz |
| 2007/0198339 | A1 | 8/2007 | Shen et al. |
| 2007/0208549 | A1 | 9/2007 | Blevins et al. |
| 2007/0250901 | A1 | 10/2007 | McIntire et al. |
| 2007/0260624 | A1* | 11/2007 | Chung et al. ............ 707/101 |
| 2007/0266025 | A1* | 11/2007 | Wagner et al. ............ 707/7 |
| 2007/0276826 | A1 | 11/2007 | Chand et al. |
| 2007/0277205 | A1 | 11/2007 | Grannan |
| 2008/0077574 | A1 | 3/2008 | Gross |
| 2008/0097829 | A1 | 4/2008 | Ritter |
| 2008/0120288 | A1 | 5/2008 | Guan et al. |
| 2008/0126303 | A1 | 5/2008 | Park et al. |
| 2008/0154873 | A1 | 6/2008 | Redlich et al. |
| 2008/0162399 | A1 | 7/2008 | Tam et al. |
| 2008/0162699 | A1 | 7/2008 | Gaffney |
| 2008/0201304 | A1 | 8/2008 | Sue |
| 2008/0201643 | A1 | 8/2008 | Nagaitis et al. |
| 2008/0249832 | A1 | 10/2008 | Richardson et al. |
| 2008/0270151 | A1 | 10/2008 | Mahoney et al. |
| 2008/0290987 | A1 | 11/2008 | Li |
| 2008/0300894 | A1 | 12/2008 | John |
| 2008/0305781 | A1 | 12/2008 | Wilson et al. |
| 2009/0024546 | A1 | 1/2009 | Ficcaglia et al. |
| 2009/0037410 | A1* | 2/2009 | Jones et al. ............ 707/5 |
| 2009/0055257 | A1 | 2/2009 | Chien et al. |
| 2009/0083258 | A1 | 3/2009 | Koren et al. |
| 2009/0089234 | A1 | 4/2009 | Sturrock et al. |
| 2009/0138326 | A1* | 5/2009 | Shi ............ 705/10 |
| 2009/0171728 | A1 | 7/2009 | Yan et al. |
| 2009/0171763 | A1* | 7/2009 | Dong et al. ............ 705/10 |
| 2009/0187515 | A1* | 7/2009 | Andrew et al. ............ 706/12 |
| 2009/0234784 | A1 | 9/2009 | Buriano et al. |
| 2009/0259969 | A1 | 10/2009 | Pallakoff |
| 2009/0265290 | A1* | 10/2009 | Ciaramita et al. ............ 706/12 |
| 2009/0271256 | A1 | 10/2009 | Toebes et al. |
| 2009/0299945 | A1* | 12/2009 | Hangartner ............ 706/50 |
| 2009/0300547 | A1 | 12/2009 | Bates et al. |
| 2009/0307296 | A1 | 12/2009 | Gibbs et al. |
| 2009/0327193 | A1 | 12/2009 | Eronen et al. |
| 2010/0010977 | A1 | 1/2010 | Choi et al. |
| 2010/0030717 | A1* | 2/2010 | Agarwal et al. ............ 706/46 |
| 2010/0030764 | A1 | 2/2010 | Koren |
| 2010/0036703 | A1 | 2/2010 | Chen et al. |
| 2010/0082413 | A1 | 4/2010 | Huberman et al. |
| 2010/0100419 | A1 | 4/2010 | Natoli et al. |
| 2010/0121624 | A1 | 5/2010 | Roy et al. |
| 2010/0121801 | A1 | 5/2010 | Roy et al. |
| 2010/0131863 | A1 | 5/2010 | Wexler et al. |
| 2010/0138452 | A1 | 6/2010 | Henkin et al. |
| 2010/0153422 | A1 | 6/2010 | Baluja et al. |
| 2010/0166339 | A1 | 7/2010 | Gokturk et al. |
| 2010/0169331 | A1 | 7/2010 | Karidi et al. |
| 2010/0241507 | A1 | 9/2010 | Quinn et al. |
| 2010/0241625 | A1* | 9/2010 | Aravamudan et al. ........ 707/734 |
| 2010/0241639 | A1 | 9/2010 | Kifer et al. |
| 2010/0250556 | A1 | 9/2010 | Park |
| 2010/0293160 | A1* | 11/2010 | Aravamudan et al. ........ 707/734 |
| 2011/0055209 | A1* | 3/2011 | Novac et al. ............ 707/737 |
| 2012/0303349 | A1 | 11/2012 | Roy et al. |

OTHER PUBLICATIONS

Current claims for PCT application No. PCT/US2010/041960, 4 pages.

Wang et al., "Shared Content Management in Replicated Web Systems: A Design Framework Using Problem Decomposition, Controlled Simulation and Feedback Learning", IEEE, Dated Jan. 2008, 15 pages.

Symeonidis et al., "Justified Recommendation Based in Content and Rating Data", In Proceedings of WebKDD 2008, 2008KDD Workshop on Web Mining and Web Usage Analysis, Las Vegas, NV, Aug. 2008, 14 pages.

Pazzani, "A Framework for Collaborative, Content-based and Demographic Filtering", Artificial Intelligence Review 13, 16 pages, dated 1999.

Wang et al., "Unifying User-based and Item-based Collaborative Filtering Approaches by Similarity Fusion", SIGIR'06, Dated Aug. 11, 2006, Seatle, Washington, USA, 8 pages.

Bell et al., "Modeling Relationships at Multiple Scales to Improve Accuracy of Large Recommender Systems", KDD'07, Aug. 12-15, 2007, San Jose, California, USA, 10 pages.

U.S. Appl. No. 13/569,728, filed Aug. 8, 2012, Notice of Allowance, mailed Jun. 12, 2013.

U.S. Appl. No. 12/825,304, filed Jun. 28, 2010, Notice of Allowance, mailed Aug. 2, 2013.

* cited by examiner

ACTIVITY BASED USERS' INTERESTS MODELING FOR DETERMINING CONTENT RELEVANCE

CROSS-REFERENCE TO RELATED APPLICATIONS

This application is related to U.S. patent application Ser. No. 12/184,114, titled "FRAMEWORK TO EVALUATE CONTENT DISPLAY POLICIES," filed on Jul. 31, 2008; U.S. patent application Ser. No. 11/899,401, titled "CUSTOMIZED TODAY MODULE," filed on Sep. 4, 2007; U.S. patent application Ser. No. 12/416,036, titled "DETERMINING USER PREFERENCE OF ITEMS BASED ON USER RATINGS AND USER FEATURES," filed on Mar. 31, 2009; and U.S. patent application Ser. No. 12/267,534, titled "ENHANCEMENT MATCHING THROUGH EXPLORE/EXPLOIT SCHEMES," filed on Nov. 7, 2008; the entire contents of which are hereby incorporated by reference as if fully set forth herein.

FIELD OF THE INVENTION

The present invention relates to creating and using user profiles, and more specifically, to creating profiles that contain information about users' interests.

BACKGROUND

As the Internet continues to expand, effective management of the massive amount of information and channeling the most relevant data to the users become increasingly challenging. The abundance of electronic data stored in today's data repositories and resourcefulness of today's search engines provide a profusion of information that often cannot be displayed on a single web page. Consequently, websites have to tailor the information displayed to users according to the users' interests.

Uses of User Interest Information

Knowing the type of information in which a user is interested helps to filter the vast amount of information down to the data that will most likely grab the user's attention. For example, knowing that the user likes browsing news headlines and is interested in sports might prompt the website to select, for display to the user, the headlines pertaining primarily to sports events, sports commentary, sports announcements, etc., and forgo the headlines pertaining to politics, economy, etc.

Moreover, knowing the type of information in which the user is interested is also helpful in Internet commerce. Displaying to a user the advertisements in which the user might be interested may increase the chances that the user actually buys a product or a service advertised by the website. For example, if it is known that the user is interested in sports and in particular in golf, displaying advertisements related to golf equipment, golf courses, golf events, etc., may be commercially more rewarding than displaying advertisements pertaining to topics unrelated to golf.

Furthermore, knowing the type of information in which the user is interested is helpful in tailoring the search results provided in response to the user's query. For example, if it is known that the user has recently joined an Internet chat-room affiliated with the PGA Tour website, then if the user submits a search query pertaining to "tours," it might be deduced that the user would like to see the PGA Tour website, a link to a PGA Tour-related chat-room and other links related to PGA golf tournaments.

Determining a User's Interests

Determining the type of information in which the user might be interested may be accomplished using various methods and various sources. For example, user's interests may be determined based on the information that the user provided when they created their own profile at various websites, user groups, Internet social networks such as Facebook™, MySpace™, Twitter™, etc. While creating a user profile, a user may also be prompted to specify the user's own interests, likes and dislikes.

Moreover, user's interests may be determined based on the documents that the user read, wrote or posted using the Internet. For example, knowing that the user wrote articles about sports, and in particular about "New York Yankees," could help in determining that articles, blogs, reports, etc, related to "New York Yankees" might be quite interesting to the user.

In addition, user's interests may be determined based on the type of chat-rooms that the user joined, the type of websites that the user visited, the type of Internet games that the user played, the searches that the user performed, etc. Other ways of determining the user's interests are also known in the art.

The information about the sites that the user browsed may be collected by server logs and specialized applications capable of accessing the user's device or the user's applications. For example, if the user retrieves web pages provided by a website controlled by a particular company, that company may track, for example, the information about the web pages that the user retrieves. If the user retrieves pages from websites that are not controlled by the particular company, the company may still track the pages visited by the user if, for example, a toolbar from the particular company is installed on the browser by which the user is visiting the pages.

Tools for Collecting a User's Interest Information

A number of software applications have been developed for collecting information about users and their interests. An example of such an application is SearchFox™ that collects historical information about the users' topic preferences in RSS feeds.

Another method for collecting information about the users is based on the RSS Feeds' approach. According to that approach, profiles are built for the users who request information from various servers. RSS feed aggregators can track the activities that the users performed and the links that the users selected. For example, the application tracks selected webpage links, blog entries, selected news headlines, played audio tracks, viewed video clips, etc.

Another approach for collecting information about the users is based on an artificial intelligence system called Content Optimization Knowledge Engine (COKE), developed by Yahoo!™. COKE collects a variety of information about the users, and based on that information and factors, such as time of day, time of year, etc., deduces the type of content that the users might be interested in and personalizes the content distributed to the users.

However, on its own, collecting information about the user and the user's past activities is often insufficient in determining which of the user's interests are the most important to the user at the present time. Collecting the user's information may provide an indication in what subjects the user was interested in the past, but does not indicate which of the interests are more or less important to the user now. Another problem with just collecting the information about the user's interests is that it does not provide indications which of the interests are long-term interests and which are nothing more than just curiosity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for activity-based users' interests modeling. Information about the interests that the users expressed during a particular period of time is stored in a data structure called a profile. A profile comprises the information about the subjects in which the users are interested in.

Each profile is associated with a "profile target." The profile target of a profile is the entity whose interests are reflected in the profile. A "profile target" may include multiple users, or may be just one individual user. For the purpose of explanation, when profile target of a profile includes multiple users, each of those users is also individually referred to as a profile target of the profile.

According to one embodiment, the actions performed by the profile target are monitored. Upon detecting that the profile target performed a particular action, a profile management system also determines (a) an action type corresponding to the particular action, and (b) content associated with the particular action.

The information about the actions, the action types, and the contents that are associated with the actions, are processed to determine the subjects in which the profile target is interested, how much interest the profile target has in each subject, and which subjects became more or less important to the profile target over time.

In one embodiment, the profile, i.e. the cumulative knowledge about the interests of the profile target, may be computed based on the information about the interests expressed over time by the profile target. The cumulative knowledge comprises the information about the subjects that the profile target is interested in, and information for determining which subjects are more important to the profile target at the present time than they were in the past.

Techniques are also described hereafter for generating information reflecting relative importance of the interests of one member of a target profile with respect to the interests of other members in the same profile target.

Profile Management System

Figure 1:
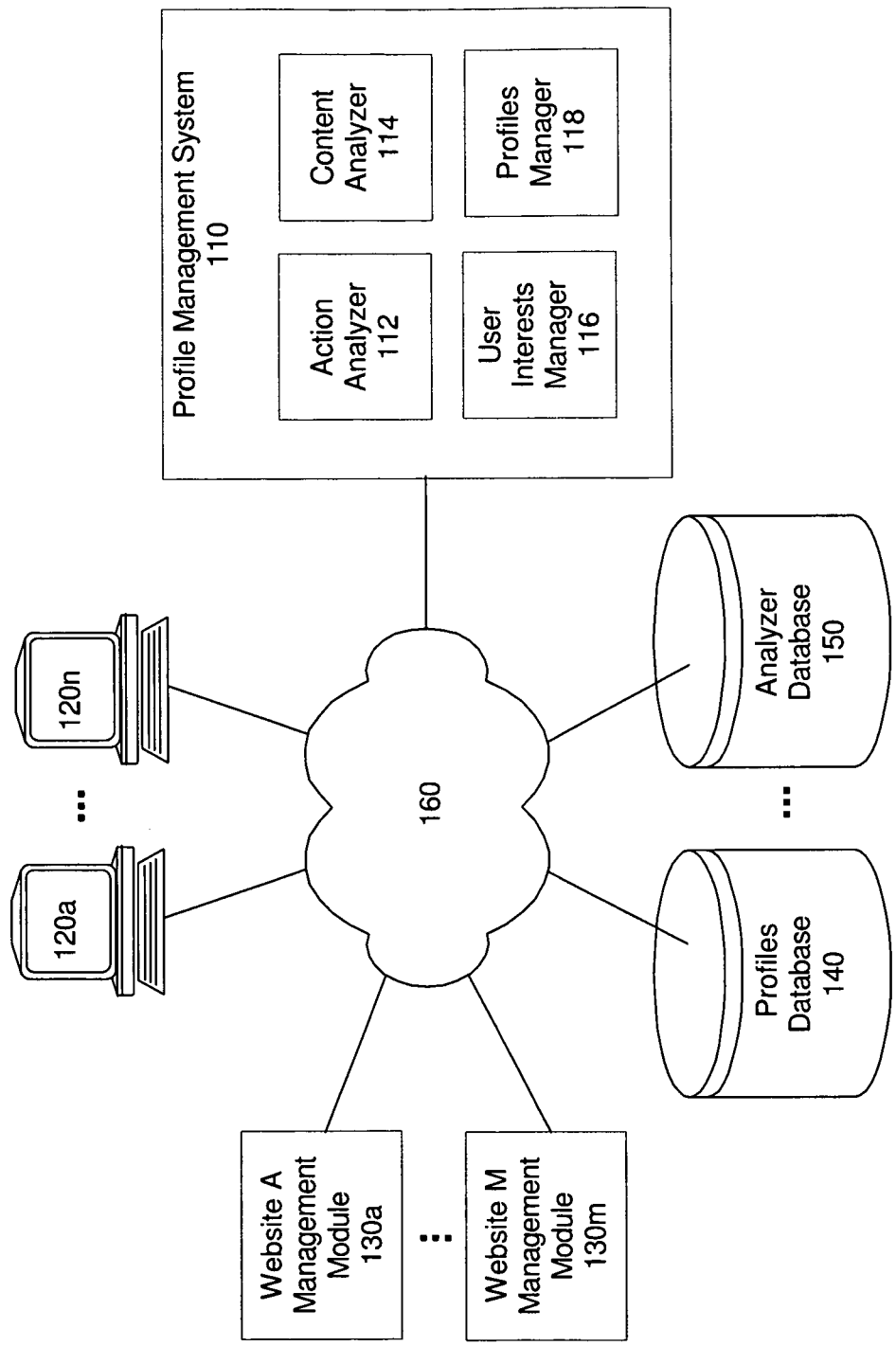
FIG. 1 is a block diagram that illustrates an example of a system in which embodiments of the invention may be implemented and practiced.

FIG. 1 is a block diagram that illustrates an example of a system 100 for managing profiles, according to an embodiment of the invention. System 100 includes one or more users 120a . . . 120n, connected to a computer network 160, and communicating over computer network 160 with each other and with various websites.

Computer network 160 may be any type of the network facilitating communications between the users and providing the Internet services to the users. For example, computer network 160 may be the Internet network to which users 120a . . . 120n connect via service provider's equipment, modems, telephone lines, etc.

According to one embodiment, computer network 160 may be a local network, or a wide area network, communicatively coupled with the Internet. Alternatively, computer network 160 may be not just one network, but a network of various heterogeneous networks communicating with each other using various communications protocols and offering various services.

Users 120a . . . 120n are users who access computer network 160 via any type of an electronic device using any type of service from any type of service provider. For example, users 120a . . . 120n may access computer network 160 from computer workstations, laptops, mainframe computers, personal digital assistant devices, etc., and may connect with the Internet using various technologies, various equipment and various communication protocols.

Users 120a . . . 120n may retrieve pages from various websites. For example, users 120a . . . 120n may load web pages into their browsers, perform document's searches using the browsers, write documents and post them using the browser, launch various applications over the Internet from the browser, etc.

Various websites are available to users 120a . . . 120n over computer network 160. The websites may be managed by corresponding website management modules 130a . . . 130m. For example, when user 120a loads a web page from a website A, a website management module 130a determines and oversees the information displayed in the user's browser; determines the sources from which the requested information should be collected; determines how the information should be sorted, filtered, arranged and displayed to user 120a; determines what type of advertisements may be displayed, etc. The website management modules 130a . . . 130m may also collect information about the user; build a repository of user's profiles; collect and update information about the user; trace the information about the user's searches, user's favorite sites, user's affiliations with user groups, social networks, etc.

Website management modules 130a ... 130m may also request information about the user's from various websites, servers and databases connected to computer network 160. For example, website management modules 130a ... 130m may request information about the user's interests to determine in what subjects the user is interested in.

According to one embodiment, a profile management system 110 is a component of system 100. Profile management system 110 collects information about the user's actions and determines the user's profile that may capture the interests expressed by the user. Profile management system 110 may create a profile for the user, determine how the interests of the individual user or the group of users change over time and determine the relationships between the interests of the individual user and the interests of the group to which the user belongs.

Profile management system 110 may be a part of any of the website management systems 130a ... 130m, or may be a standalone system that is communicatively coupled with network 160. Alternatively, profile management system 110 may be implemented as a client application communicating with the websites over network 160.

Profile management system 110 comprises an action analyzer 112, a content analyzer 114, a user interest manager 116 and a profile manager 118. All the components of profile management system 110 may be communicatively connected with each other and may share the resources, such as information, databases, etc.

Action analyzer 112 is a computer implemented module that collects information about the user and user's actions. The information about the user's action may be collected by accessing the information stored on the user's computer device, stored on various servers and/or in various databases. For example, the information about the user's actions maybe accessed from the user's computer, collected by various servers, tracked by a specialized applications, etc. According to another example, the information about the user's actions may be collected using such tools as SearchFox™, RSS Feeds, COKE, website toolbars, etc.

Action analyzer 112 analyzes the collected information, identifies actions performed by the user and determines action types for the actions. Action types will be described below.

The information collected and computed by action analyzer 112 may be saved in a database called an analyzer database 150. Analyzer database 150 may be implemented in a standalone server communicatively coupled with network 160, or may be a part of profile management system 110.

The primary functions of content analyzer 114 are to identify the contents associated with the user's actions and to analyze the contents associated with the actions. The purpose of analyzing the contents is to determine what the content is about. For example, if the user wrote a document and posted the document over the Internet, content analyzer 114 will examine the content of the document and determine a list of subjects/topics that were discussed in the document. Details about the content analysis are provided below.

User interest manager 116 collects the information from action analyzer 112, content analyzer 114 and databases communicatively coupled with profile management system 110, and processes the information to determine the interests of the profile target. For example, user interest manager 116 may determine how much interest the profile target has in the individual subjects, and which of those subjects became more or less important to the profile target over time. Details about user interest manager 116 are provided below.

Profiles manager 118 collects information from other modules of profile management system 110 and, based on that information and the information stored in analyzer database 150, associated with profile management system 110, determines the interests of the profile target. For example, profile manager 118 determines how the interests of an individual member of the profile target impact the combined interests of other members of the profile target, and how the combined interests of the profile target impact the interests of the individual members of the profile target. Furthermore, profile manager 118 determines how the interests of the profile target change over time and which of the interests remain important to the profile target despite the passage of time. Details about profile manager 118 are provided below.

Information about profiles may be stored in a database called a profile database 140, which may be implemented in a standalone server or may be a part of analyzer database 150.

Users and Profile Targets

According to one embodiment, a user is a computer network user who accesses a computer network from an electronic device communicatively coupled with the network. The information specific to the user, or the profile target, may include the profile target's demographics characteristics, such as the age, gender, residence, user's computing device configuration, etc. For example, one profile target may include males, aged 20-25, who reside in California, while another profile target may include females, aged 25-30, who reside in San Jose, Calif.

According to another example, the information specific to the profile targets may include information about the user groups or social networks with which the user is affiliated. According to other example, the information about the user's interest may be stored in a profile.

Collecting Information about Profile Target

Information about the profile target may be collected from various sources and using various methods. As described above, some of the users enter information about themselves while joining users' groups, setting up various computer accounts, while joining social network such as FaceBook™, Twitter™, etc.

Other information may be collected by intercepting the information about the actions that the users performed while using the Internet. For example, the collected information may include the details about browsing, posting a blog, reading electronic advertisements, etc.

The information about the profile targets may be intercepted using various methods and tools. For example, the information may be collected from "cookies," collected by server logs from various websites, toolbars, etc. For instance, if the user is interacting with the website of a company, the company may easily monitor the user's actions.

However, if the user is interacting with the site that is not managed by a company website (a third-party site), then the information about the user may be collected by a toolbar, provided by the company and installed on the browser of the user. If so, the toolbar can collect the information about the user, the user's actions, and the documents that the user read or wrote.

Actions and Actions' Types

Various actions performed by a user may be divided into groups of actions and each group of actions may have assigned a specific action type. For example, if a user is writing a blog, an action type associated with the action of writing the blog may be called "blogging." The action type "blogging" may be assigned to an action that in some way is related to blogging, i.e. to writing a blog, reading a blog, posting a blog, etc. According to another example, an action type called "browsing" may be assigned to the actions that require launching a browser, using the browser, sending a search query to the browser, etc. Other action types may include reviewing, thumbs up, page viewing, clicking on a link, sending an email, bookmarking, posting a photograph, designing a page, etc.

In one embodiment, the actions performed by a profile target are monitored by the profile management system 110, depicted in FIG. 1. For example, referring to FIG. 1, when user 120a, who belongs to a particular profile target (not depicted in FIG. 1), initiates an action requiring an Internet resource, a specialized client application, residing on the user's computing device, on any of the website management modules 130a . . . 130m, or on profile management system 110 intercepts information about that action and provides the information to action analyzer 112.

Among various actions performed by the user, certain actions may be more important to the user than the others, and thus, certain actions may indicate the subjects in which the user is more interested in. This is based on the observation that, most likely, the more effort the action requires, the more interest the user has in the subject of that action. For example, between actions "blogging" and "ThumbsUp," blogging may be more important to the user than ThumbsUP because blogging requires more effort on the user's part (i.e. composing and revising the article) than ThumbsUp, which only requires skimming an article and clicking on the selected button.

In one embodiment, the actions are ordered based on how frequently the user performs them. For example, an action analyzer may analyze two actions performed by the user, and may determine that the action that the user performed more frequently than the other may be the most important to the user. Such a determination is based on an observation that people usually perform the same action repeatedly if repeating the same action is enjoyable. Moreover, the actions that the user performs for a long period of time and repeat periodically within a long period of time may be considered long-term actions, and are most likely indicative of the user's long-term interests.

On the other hand, the action that the user performs rarely or occasionally, may be an example of an action that is no more than just curiosity. For example, if on one occasion the user clicked on an unsolicited advertisement about "fashion," the user's interest in "fashion" may be rather "curiosity" than a long-term interest.

According to one embodiment, the actions are globally ordered for all users. For example, the actions performed more recently are treated as the actions more important to the users, while the actions performed a long time ago are treated as less important to the users at the present moment. The rationale of such an order is based on observing that user's interests change over time, and what was interesting to the users in the past may not be interesting to the users now.

Content Associated with an Action

According to one embodiment, an action may have associated content. The content may be any word, term or phrase that is indicative of the content's subjects. Such a word or a term may be extracted from the document that the user wrote, posted on the Internet, read, etc., and compared with a reference dictionary that contains already defined subjects.

A dictionary of known subjects may be organized as a list comprising entries where each entry contains a subject and at least one word, term or phrase semantically related to the subject. For example, a very simple dictionary may comprise the following entries: {cars: (car, cars), efficiency: (efficiency, efficient, efficiently}, where "cars" and "efficiency" are subjects, and the remaining words are semantically related to the "cars" and "efficiency," respectively.

In one embodiment, determining the subjects indicative of the content may be performed by matching the words/terms/phrases from the dictionary to the words/terms/phrases present in the particular content, and for the words/terms/phrases that match, determining the corresponding subjects from the dictionary. For example, if a very simple dictionary comprises the following entries: {cars: (car, cars), efficiency: (efficiency, efficient, efficiently}, and the content comprises the following text "The President unveils car efficiency standards," then the set of the subjects indicative of the content may include: {cars, efficiency}.

In one embodiment, an action performed by the user may have an associated content. Examples of the contents associated with the actions include, but are not limited to, the text that the user wrote or posted, the page that the user requested, the document that the user reviewed, etc. Referring to the above example, if the user is "reading a blog," the associated content may be the text that the user read while "blogging." According to another example, if a user is browsing the Internet, the content associated with the "browsing" may be the URL address of the page that the user downloaded or the text of the page displayed to the user once the user selected a particular link.

However, determining the content associated with other actions may be more complicated than determining the content for "blogging," or "browsing." For example, if an action is "posting a photograph" on a Facebook™ page, the content associated with that action is not obvious because the content of the photograph may be a bitmap, a jpeg/tiff file, etc., not a document file. In such a case, the content associated with "posting a photograph" may be determined using metadata, such as the name of the file containing the photograph.

According to another example, if a user posts a song on a user group's website, then the content associated with "posting a song" cannot be the content of the song because the song might be in, e.g. mp3 format, not in a document format. In such a case, the content associated with "posting the song" may be determined to be, for example, the name of the song or the name of the file containing the song.

Analyzing the Content

In one embodiment, the content associated with the action is analyzed and the words, terms or phrases indicative of the subjects that are specific to the content are determined.

However, not all words/terms/phrases that are present in the content are necessarily indicative of the subjects that are specific to the content. For example, the words such as "and," "I," "but," etc. very rarely indicate what the content is about.

The words, terms, or phrases that are indicative of the content's subjects may be determined by comparing the content with a reference dictionary that contains already defined subjects. The dictionary may be a collection of subjects that a designer of the system identified as distinguishable subjects and updated as additional subjects were found.

The dictionary of known subjects may be organized as a list comprising entries where each entry contains a subject and at least one word, term or phrase semantically related to the subject. For example, a very simple dictionary may comprise the following entries: {cars: (car, cars), efficiency: (efficiency, efficient, efficiently}, where "cars" and "efficiency" are subjects, and the remaining words are semantically related to the "cars" and "efficiency," respectively.

In one embodiment, determining the subjects indicative of the content may be performed by matching the words/terms/phrases from the dictionary to the words/terms/phrases present in the particular content, and then identifying the subjects in the dictionary associated with the matched words/terms/phrases. For example, if a very simple dictionary comprises the following entries: {cars: (car, cars), efficiency: (efficiency, efficient, efficiently}, and the content comprises the following text "The President unveils car efficiency standards," then the set of the subjects indicative of the content may include: {cars, efficiency}. Content analysis may be performed by content analyzer 114 depicted in FIG. 1.

Prisma Vector

The content of a document may be represented in various structures and using various methods. One of the approaches to representing document's content is available from the tool called PRISMA/DB, which is a full-fledged parallel, relational database management system (DBMS).

One of the data structures used by the PRISMA/DB is a "prisma vector," which is intended to serve as a concise representation of the content of a document. A prisma vector may have a variable length and may contain various data fields for storing the terms and their parameters.

For the purpose of determining the content of the document, it is sufficient to define the prisma vector as a vector comprising a set of pairs where each pair comprises a subject and the subject weight values associated with the subject. The examples of the subjects include the words, terms, phrases, etc., identified in the content of the documents that also have been determined as indicative of the content of the document and implicative of the interests which the document attempts to target. For example, a user visited an exemplary web page P1, which may have some associated content.

Page P1 has an associated "content p1" that comprises various words, terms and phrases displayed on the page. A content analyzer analyzed the content of page P1 against a previously created content dictionary and determined that various terms and phrases from the content dictionary were also present in the "content p1." The content analyzer selected those terms and phrases as indicative of the page's "content p1." In this example, the selected subjects were: "cars," "AFP," "efficiency standard," "Barack Obama," "regulations," and "auto industry."

Subject Weights

In one embodiment, each subject may have an associated subject weight value. A subject weight value associated with the particular subject may indicate how much weight the particular subject contributes to the calculation of the user's overall interests.

Subject weight values depend on various factors, such as: in what part of the content the words/terms/phrases corresponding to the particular subject were uttered, how many times the particular words/terms/phrases corresponding to the particular subject occurred in the content, etc.

According to one embodiment, the subject weight values may also depend on the type of the action performed by the user. For example, the subject weight value corresponding to the subject "cars" identified in the content associated with the "blogging" may be higher than the weight value of the same subject "cars" identified in the content that was displayed in an unsolicited electronic advertisement. The subject "cars" identified in "blogging" may have a higher weight than if identified in the unsolicited advertisement because by "blogging" about the cars the user actually expressed an interest in "cars," while by reading the unsolicited ad the user may not have expressed any interest at all.

Assigning Subject Weights to the Subjects

The manner in which different factors impact the overall subject weights may be captured by (1) using various databases that store initial weights values for various subjects, and (2) using various methods that describe how the overall subject weights might be computed. For example, the subject weight of the subject "cars" associated with a particular action type may be computed using the following formula: subject_weight=10*n, where "n" is the number of repetitions of the word(s) indicating the subject {cars} in the content.

Using the above formula, in an example where the word "car" was uttered twice in the content, the overall subject weight value associated with the subject "cars" is 10*2=20. The formulas and initial weights for the subjects identified in the subject's dictionary may be stored in a weight's database accessible to the profile management system.

Referring to the example where the content associated with the user's action was page P1, using the weights' database, the content analyzer may determine corresponding weights for each of the selected subjects. In this example, the content analyzer returned the following results:

TABLE 1

Subject-weight representation of page P1.

| Subjects | Weight |
|---|---|
| cars | 20 |
| AFP | 15 |
| efficiency standard | 10 |
| Barack Obama | 20 |
| regulations | 5 |
| auto industry | 5 |

The above results for P1 may be summarized in the following prisma vector: [cars: 20, AFP: 15, efficiency standards: 10, Barack Obama: 10, regulations: 5, auto industry: 5]

User's Interests

In determining user's interests, various factors and data may be taken into consideration. For example, if the user is writing a blog or an article about some subjects, those subjects might be more important to the user than other actions because the user took the time and made an effort to write about those subjects. Hence, if the user performed two actions, such as writing a blog about "cars," and bookmarking a link to "cars," assuming other factors being equal, writing a blog may indicate interests more important to the user than bookmarking.

The fact that certain actions may be more important to the user than the others may be reflected in weighing the more important action (and the subjects related to the action) higher than the other actions. For example, certain actions that belong to a certain action type (also referred as a category) may be ranked higher than other actions, and thus may contribute to the overall measure of the user's interest more significantly than the other actions. For example, if the user blogged about "cars," and bookmarked a link to "cars," then the subject identified in relation to "blogging" contributes more significantly to the user's interests than the subject identified in relation to "bookmarking." This determination may be performed by user interest manager 116, depicted in FIG. 1.

User Interest Vector

The information about the users' interests may be represented in various ways. For example, the information about the interests may be represented using a data structure called a user interest vector V(t). The user interest vector contains a collection of pairs, where each pair comprises a subject and the subject weight value associated with the subject. The subject in the user interest vector is referred to as "interest," and the subject weight value of a particular subject is referred to as an "interest weight." The interest weight associated with the particular interest indicates how important the particular interest is to the user at the present moment and in reference to other subjects.

In one embodiment, a user interest vector is computed in response to detecting that a user performed an action that was associated with a particular content. For example, if at time T1, while performing a particular action of the particular type, the user wrote an article about {cars, efficiency}, where the weight associated with {cars} is 20 and the weight associated with {efficiency} is 5, then the user interest vector representing the user's interests at time "T1," may be represented as V(T1)=[cars: 20, efficiency: 5]. The information in the user interest vector V(T1) may be interpreted as follows: the user, who performed the particular action at time "T1," expressed an interest in two subjects: "cars" and "efficiency;" the user is more interested in "cars" than in "efficiency" because, although the document resulting from the action pertained to both "cars" and "efficiency," the document pertained to "cars" more than to "efficiency." The document pertained to "cars" more than to "efficiency" because, after analyzing the document, it was found that the weight associated with "cars" was "20," and the weight associated with "efficiency" is "5."

Applying a Decay Function to the User Interest Vector

In one embodiment, the user interest vector V(t) captures the information indicating that some of the interests might be long-term interests, and others might be nothing else but curiosity. For example, if the user has been intensively writing and posting various blog entries about cars but only on one occasion the user read an article about "fashion," then the user interest vector V(t) may capture that fact by computing a relatively high interest weigh for the interest "cars," and relatively low interest weight for the interest "fashion."

Computing a User Interest Vector

There are various ways of representing the user interest vector V(t). According to one approach, the user interests vector V(t) is defined as:

$$V(t)=f(P(d),A,D(u))+N*e^{(-t/\lambda)},$$

where:
P(d) is a prisma vector for the content of document d,
A is the type of the action performed by the user,
D(u) is a function representing demographics information about the user,
d is the document associated by action A,
N is a curiosity indicator, marked as "#" if the action type is "curiosity,"
$e^{(-t/\lambda)}$ is an exponential decay function with $\lambda$ being a constant determined experimentally,
f is a function yielding a real number; multiplication is used for illustration.

For example, a user performed a particular action having an associated type indicating "curiosity" (as opposite to long-term interests), and an associated document d. Document d has the following prisma vector:
[James Frey: 50, Oprah Winfrey: 40, Reuters: 40, memoir: 35, Vanity Fair: 10, revelations: 5]
where the prisma vector indicates the following relation between the subjects and their corresponding weights:

TABLE 2

Subject-weight representation of page P(d).

| Subjects | Weight |
| --- | --- |
| James Frey | 50 |
| Oprah Winfrey | 40 |
| Reuters | 40 |
| memoir | 35 |
| Vanity Fair | 10 |
| revelations | 5 |

Then, the user interests vector V(t) may be computed as follows:
V(t)=f (25, [James Frey: 50, Oprah Winfrey: 40, Reuters: 40, memoir: 35, Vanity Fair: 10, revelations: 5])+ [0]# =>
V(t)=25*[James Frey: 50, Oprah Winfrey: 40, Reuters: 40, memoir: 35, Vanity Fair: 10, revelations: 5] =>
V(t)=[James Frey: 1250, Oprah Winfrey: 1000, Reuters: 1000, memoir: 875, Vanity Fair: 250, revelations: 125]

In this example, the information in the user interest vector V(t) may be interpreted as follow: the user performed a curiosity action by reading a webpage P. The weight assigned to the action is 25. That action and the content of the webpage indicated that, at the moment, the user was interested in "James Frey," "Oprah Winfrey," "Reuters," "memoir," "Vanity Fair," and "revelations," and the above topics are listed above from the most interesting to the user to the least interesting one.

User Profile Vector

As the user in the profile target initiates and performs various actions, information about those actions may be collected to represent the cumulative interests of the profile target. The cumulative knowledge about the interests of the profile target may be represented in various ways. For example, the user interests' vectors of the users of the profile target may be used to represent the cumulative knowledge about the interests that the user has expressed from the time the collection about the users' interests started to the present moment.

In one embodiment, the information in the user profile vector may be organized according to the importance of the individual interests to the user at the present moment. For example, if in the past, the user expressed an interest in "cars," and recently the user expressed an interest in "fashion," the user profile vector will indicate that the user is interested in "cars" and in "fashion," and will indicate whether now "cars" are more or less important to the user than "fashion."

A user profile vector may be represented as an ordered list of various interests expressed by the user during a certain period of time. The user profile vector may be updated each time new information about actions performed by the user is available. The user profile vector is updated to reflect the fact that some of the user's interests may be more or less important to the user over time. That relationship may be captured by applying the decay function to the interests already identified in the user interest vectors.

There are various ways of mathematically representing user profile vector associated with the user. One way is to use the following formula:

$$V = V(t)*\alpha + V(t-1)*(1-\alpha),$$

where:
  V(t) is the user interest vector updated at time t, and
  α is a history coefficient, determined experimentally.

The user interest vector computed at time t=T1 is as follows:
  V(t)=[James Frey: 1250, Oprah Winfrey: 1000, Reuters: 1000, memoir: 875, Vanity Fair: 250, revelations: 125]

As described above, α is determined experimentally, and represents a decay component to ensure that the newer interests contribute more to the user profile than the older interests.

In this example, α=0.7. Note that V(t−1)[ ], a blank vector, if the profile management system has not collected any information about the user's interests prior to the time t=T1. Hence, the user profile vector V may be represented as:

$$V = V(t)*0.7 + V(t-1)*(1-0.7) \Rightarrow$$

V=[James Frey: 1250, Oprah Winfrey: 1000, Reuters: 1000, memoir: 875, Vanity Fair: 250, revelations: 125]*0.7+0.3*[ ] =>

V=[James Frey: 875, Oprah Winfrey: 700, Reuters: 700, memoir: 612.5, Vanity Fair: 175, revelations: 87.5]

The information included in the above user profile vector may be interpreted as follows: based on the information collected about the user so far, after performing the action at time T1, the user is the most interested in "James Frey," then in "Oprah Winfrey," "Reuters," "memoir," "Vanity Fair," and the least in "revelations."

Benefits of Deep Profiles

In one embodiment, a user profile vector may be called a deep profile because it represents very detailed information about the combined interests that the profile target has expressed up to date, indicates how those interests have changed over time and which of those interests are the most important to the user at the present time.

The approach for modeling users' interests based on deep profiles provides a simple yet effective way to profile users on the basis of their actions and the contents associated with the actions.

Though there are several mechanisms of user profiling, the approach presented in this application incorporates the novel approach of weighting features by user actions, which is a direct indicator of the interest in the content. In conjunction with a prisma vector, which is a representation of the essence of the content, one can determine user's short term and long term interests. By revising and updating the user profile vector, the vector represents up-to-date, weighted, prioritized and interrelated list of subjects that interests the user the most at the particular moment in time.

Predicting the Most Relevant Content to the User

A user profile vector may be used to predict the most relevant content displayed to the user. For example, if the user in the profile target has expressed a great deal of interest in "cars," but very little interest in "fashion," it might be appropriate to deduce that when the user wants to read news headlines, the headlines about "cars" might be more interesting to the user than the headlines about "fashion."

Similarly, if the user is more interested in "cars" than in "fashion," while targeting and selecting electronics advertisements, it might be appropriate to deduce that the user might be more inclined to buy automotive magazines than fashion magazines.

Data Structures

The information used to compute the user interest vector V(t) may be stored in various data structures. One example of such structures is depicted in FIG. 2.

Figure 2:
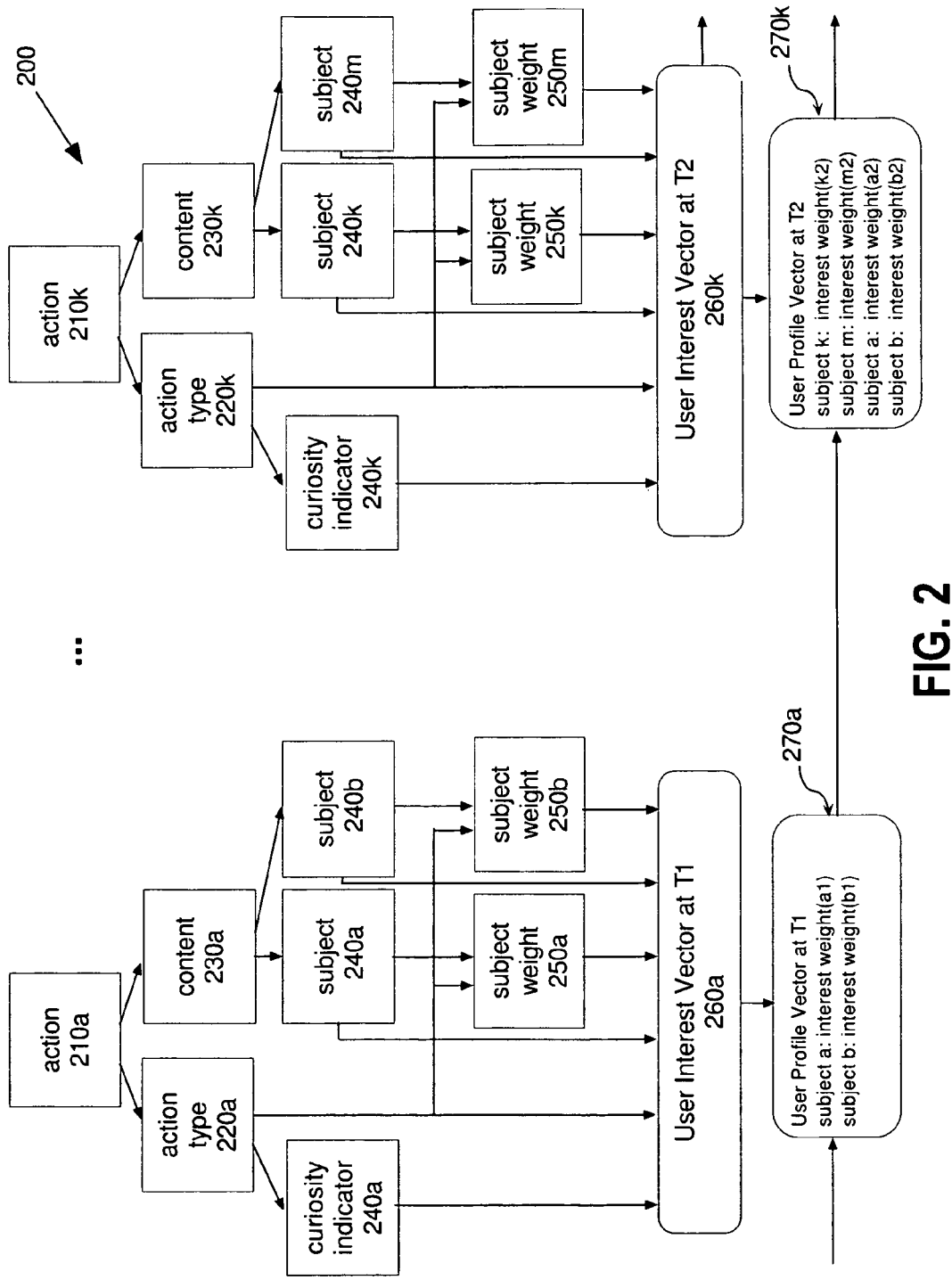
FIG. 2 is a block diagram that illustrates an example of data structures on which embodiments of the invention may be implemented and practiced.

FIG. 2 is a block diagram that illustrates an example of data structures 200 on which embodiments of the invention may be implemented and practiced. FIG. 2 depicts two user interest vectors computed based on two different actions performed at two different times. The first user interest vector 260a is computed at time t=T1, while the second user interest vector 260k is computed at time=T2. The information stored in the user interest vector 260a, computed at T1, is used in computing the user interest vector 260k at time T2.

The information about the action that the user performed at time T1 is stored in a data structure referred to as an action 210a. The information about the action type associated with action 210a is stored in the structure called an action type 220a, and an indicator whether action 210a is a long-term interest or just "curiosity" is stored in a data structure called a curiosity indicator 240a.

The information about the content associated with action 210a is stored in a data structure depicted as a content 230a. Content 230a is analyzed and a set of subjects indicative of the content is identified. Content 230a may have one or more subjects. Two exemplary subjects for content 230a are depicted in FIG. 2, which are a subject 240a and a subject 240b.

The weigh associated with subject 240a is stored in a data structure referred to as a subject weight 250a, while the weight associated with subject 240b is stored in a data structure referred to as a subject weight 250b. Subject weights 250a and 25b may depend on the corresponding subjects 240a and 240b, and/or on action type 220a of action 210a.

A user interest vector 260a, indicating the user's interests deduced from the user's action performed at time T1, is computed based, at least in part, on the information represented by action type 220a, curiosity indicator 240a, subject 240a, subject weight 250a, subject 240b and subject weight 250b. Other information, such as parameters for a decay function, may also be included in computing user interest vector 260a.

A user profile vector 270a, representing the combined interests of the user at time T1, is updated based, at least in part, on the information present in a previously computed user profile vector (note depicted in FIG. 2), and in user interest vector 260a. In the example depicted in FIG. 2, assuming that the previous user profile vector was blank, and subject 240a and subject 240b are indicative of content 230a of action 210a, and the corresponding subject weights are subject weight 250a and subject weight 250b, user profile vector 270a may comprise the following data pairs:

{subject a: interest weight (a1)}
{subject b: interest weight (b1)}.

A user interest vector 260k, representing the user's interests at time t=T2 is computed in a similar fashion as user interest vector 210a, described above.

A user profile vector 270k, indicating the combined interests of the user at time T2, is updated based, at least in part, on the information stored in user profile vector 270a, and the information present in user interest vector 260k. In the example depicted in FIG. 2, the list of subjects identified at time T1 was supplemented by the subjects identified at time T2, the corresponding interest weights were recomputed at time T2 to represent the profile interests at time T2, and the user profile vector 270k comprises the following data pairs:

{subject k: interest weight (k2)}
{subject m: interest weight (m2)}
{subject a: interest weight (a2)}
{subject b: interest weight (b2)}.

Profile for a Profile Target

In one embodiment, user profile vectors of the members of a group are combined and a cumulative representation of the interests of the group as a whole is computed. The representation of the interests of the group of users is called a profile for the profile target. For example, if one or more users belong to a particular profile target group, than a profile for the profile target may be a vector computed by processing the information from the individual user profiles of the individual users.

A profile associated with the profile target may be updated by including all the interests expressed by the profile target members and computing resulting interest weights from the interest weights associated with the particular interests expressed by the target members. For example, if a particular profile target comprises two users and the first user is interested in "cars," while the second user is interested in "fashion," the target profile might comprise "cars" and "fashion" as interests, and the weights associated with the interests will correspond to a combined amount of interests the profile target has as a group in "cars," and in "fashion," respectively.

In one embodiment, the profile associated with the profile target is updated to include the demographics characteristics of the users and/or the demographics characteristics of the profile target as a group.

In one embodiment, the information stored in the profile associated with the profile target may be used to update user interest vectors of the individual members of the profile target to reflect the impact made by the change in the interests of the profile target on the interests of the individual members.

Updating a Profile for the Profile Target

Figure 3:
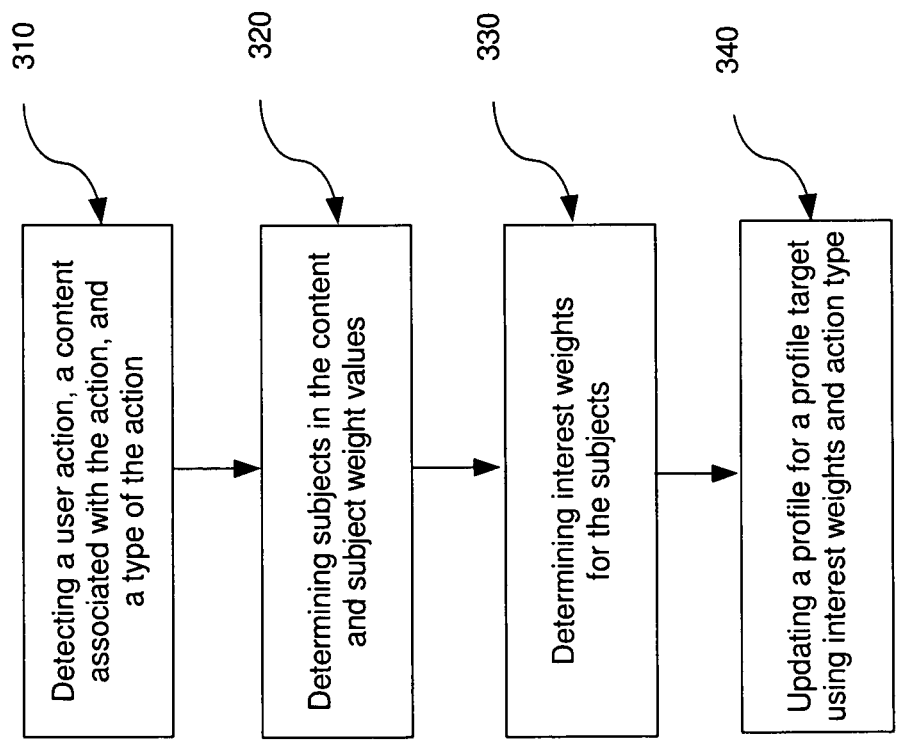
FIG. 3 is a flowchart that illustrates an example of updating a profile associated with a profile target, according to an embodiment of the invention.

FIG. 3 is a flow chart that illustrates an example of updating a profile associated with a profile target according to an embodiment of the invention. In step 310, an action performed by the user associated with the profile target is detected. Various ways of intercepting information about user's actions were described above. The information about the action is sent to the profile management system.

The profile management system receives the information about the user's action and transmits that information to an action analyzer. The action analyzer determines the type of action type associated with the action, and determines whether the action has a character of a long-term interest, or curiosity. The differences between a long-term interest action and a curiosity action were described above.

In step 320, the profile management system transmits the information about the action to a content analyzer. The content analyzer determines the content associated with the action. Various examples of contents and methods for determining the contents were described above.

Subsequently, the content analyzer determines the subjects indicative of the issues specific to the content. This may be accomplished using a list of subjects or a dictionary described above. The subjects are determined based on the words, terms and/or phrases indicative of the topics known as subject, or interests.

Then, the subject weights associated with the subjects are determined and an intermediary user interest vector is computed. The subject weights represent the amount of interest that the user might have in the particular subject, and may be determined using empirical data, mathematical formulas, information about the subjects themselves, type of actions associated with the actions, etc. Detailed description of the subject weights was provided above.

In step 330, the profile management system transmits the results of the previous processing to a user interest manager. The user interest manager determines one or more interest weights for the set of the subjects identified by the content analyzer. The interest weights may be computed taking into consideration the respective subject weight values and the action type associated with the action performed by the user. The subjects, now referred to as interests, are coupled with the corresponding interest weights and the resulting pairs are ordered according to the interest weight values. The ordered pairs may be represented as a user interest vector, described above.

Subsequently, in step 340, the user interest manager may send the user interest vector to a profile manager that maintains and updates a user profile vector. The profile manager will process the user interest vector to incorporate the information about the user's interest recorded in the past. The updated user profile vector reflects how the user's interests have changed over time. The results of this processing may be stored in a profile database associated with the user.

In step 340, the profile manger also updates a profile associated with a particular profile target, to which the user belongs. The profile associated with the profile target is based, at least in part, on the interest weights from the updated user profile. The details about generating the profile for the target group were described above.

EXAMPLES

Computing a User Interest Vector and a User Profile Vector

In this example, the various actions performed by the user during an Internet session are divided in to four separate action types. The four action types are: 1) blogging, 2) reviewing, 3) thumbs up, and 4) page viewing. The names of the action types are abbreviated to B, R, T and P, respectively.

Furthermore, in this example, the action types associated with B, R and T indicate long term interests, while action type for P indicates curiosity.

Each of the action type may have an assigned action type weight. A particular action type weight reflects a relative contribution that the action of the particular type carries toward the overall measure of the user's interests. In this example, the following action type weights: B=100, R=50, T=25, P=200. (The demographics' component is ignored for a moment.)

Furthermore, in this example, the user visits three exemplary web pages P1, P2 and P3. Page P1 is may be dedicated to political news, political events, political commentaries, etc.

Page P1 has an associated content p1 that comprises various words, terms and phrases displayed on the page. A content analyzer analyzed the content of page P1 against a previously created content dictionary and determined the terms and phrases and a corresponding set of subjects indicative of the page content p1. In this example, the set of subjects comprises: "cars," "AFP," "efficiency standard," "Barack Obama," "regulations," and "auto industry."

Subsequently, using a weights' database, the content analyzer determined corresponding weights for each of the selected subjects. In this example, the content analyzer returned the following results:

TABLE 3

Subject-weight representation of page P1.

| Subject | Weight |
| --- | --- |
| cars | 20 |
| AFP | 15 |
| efficiency standard | 10 |
| Barack Obama | 20 |
| regulations | 5 |
| auto industry | 5 |

The above results for P1 were summarized in the following prisma vector:

[cars: 20, AFP: 15, efficiency standards: 10, Barack Obama: 10, regulations: 5, auto industry: 5]

This vector represents a gist of the page. It provides a snapshot of what the page talks about and identifies the relative importance of selected subjects present on the page.

Another page, P2, may be about celebrity gossips and may have the following prisma vector:

[James Frey: 50, Oprah Winfrey: 40, Reuters: 40, memoir: 35, Vanity Fair: 10, revelations: 5]

Page P3 may be about movies and may have the following prisma vector:

[Movies: 100, The Hunt for Red October: 70, Trailers: 50, Showtimes: 50, Premiere Photos: 50, Paramount Pictures: 40, Critics Reviews: 40]

The information about pages P1, P2 and P3, the corresponding URLs and the corresponding vectors is then stored in a profile management system and ready to use for determining users' interests.

In this example, a new User joins the network and is using the network's services for the first time. Since this is the first time the User is using the network's services, the profile management system has no information about the User's interests. Thus, the profile management system associates a blank user interest vector V(t)=[ ] with the User.

In this example, the User is the only user in a particular target group.

User's interest vector is indexed by a timeline associated with the user actions, and changes according to the actions that the User performs. In this example, the following notation is used to indicate that the user interest vector V(t) was computed to reflect a change in the user's interests after the User visited the page P while performing the action A of type "T" at time t:

$T:A \to P, V(t),$ where:
T represents the time when the User performed the type A action,
P represents the page that the User visited while performing the type A action at time T, and
V(t) represents the user interest vector updated at time T.

As described in the previous sections of this application, the user interests vector V(t) is defined as:

$V(t) = f(P(d), A, D(u)) + N^* e^{\hat{}}(-t/\lambda),$ where:
P(d) is a prisma vector for the document d,
A is the type of the action performed by the User,
D(u) is a function representing demographics information about the User,
N is a curiosity indicator, and
$e^{\hat{}}(-t/\lambda)$ is an exponential decay function with $\lambda$ being determined experimentally.

As the User continues with the Internet's session and initiates various actions, the profile management system systematically collects information about the User's actions. For example, if at time T1 the User initiated an action "A" of type T ("thumbs up") by invoking page P2, the information about initiating the type "T" action "A" at time T1 and visiting page P2 is sent to the profile management system for further processing. The profile management system updates the User's interest vector to reflect any change in the User's interests that took place at time T1.

Using the above notation and by substituting the above definition of V(t) for V(t), the updating of the user interest vector V(t) after the User initiated a type T action at time T1 by invoking page P2 yields the following:

$T1:T \to P2, V(t) = f(P(d), A, D(u)) + N^* e^{\hat{}}(-t/\lambda).$

However, as described above, the action type T refers to the "thumbs up" type action, which is associated with long-term interests, not just curiosity. Therefore, N in the above equation is zero. For clarity, if the action has a curiosity indicator, a "#" is entered after the prisma vector for the document. Note also that the action weight value associated with the action type "T" is "25."

As described above, page P2 has the following prisma vector:

[James Frey: 50, Oprah Winfrey: 40, Reuters: 40, memoir: 35, Vanity Fair: 10, revelations: 5]

Therefore, the user interests vector V(t) is computed as follows:

V(t)=f(25, [James Frey: 50, Oprah Winfrey: 40, Reuters: 40, memoir: 35, Vanity Fair: 10, revelations: 5])+[0]#=>

V(t)=25*[James Frey: 50, Oprah Winfrey: 40, Reuters: 40, memoir: 35, Vanity Fair: 10, revelations: 5]=>

V(t)=[James Frey: 1250, Oprah Winfrey: 1000, Reuters: 1000, memoir: 875, Vanity Fair: 250, revelations: 125]

As described in the previous sections of the application, a user profile vector V associated with the user is defined as follows:

$V = V(t)^* \alpha + V(t-1)^* (1-\alpha),$ where:
V(t) is the user interests vector updated at time t, and
$\alpha$ is a history coefficient, determined experimentally.

As described above, a is determined experimentally, and represents a decay component to ensure that the newer interests contribute more to the user profile than the older interests. In this example, $\alpha$=0.7. V(t−1)=[ ], a blank vector, since the profile management system has not collected any information about the User's interests prior to the time t. Hence, the user profile vector V may be represented as:

$$V=V(t)*0.7+V(t-1)*(1-0.7) \Rightarrow$$

V=[James Frey: 1250, Oprah Winfrey: 1000, Reuters: 1000, memoir: 875, Vanity Fair: 250, revelations: 125]*0.7+0.3*[ ] =>

V=[James Frey: 875, Oprah Winfrey: 700, Reuters: 700, memoir: 612.5, Vanity Fair: 175, revelations: 87.5]

The user profile vector V, computed as described above, represents the user's interests for User, who, at time T1, performed his first action that had type T and involved accessing page P2.

The information in the user profile vector may be interpreted as follows: at time T1, User seems to be interested the most in "James Frey," then in "Oprah Winfrey," while "revelations" are marginally interesting to the User.

Now, at time T2, User initiates action of type P, and the action involves accessing the page P1. This can be represented as follows:

$$T2:P\rightarrow P1, \text{ so } V(t)=f(P(d),A,D(u))+N*e^{\wedge}(-t/\lambda),$$

where $N=f(P(d),A,D(u))$

As described above, the prisma vector for page P1 is:
[cars: 20, AFP: 15, efficiency standards: 10, Barack Obama: 10, regulations: 5, auto industry: 5]

The action type P indicates curiosity, not user's long term interests. Therefore, the first term will be 0 because there is no long term interest indicator. Therefore, user interests vector V(t) may be computed as follows:

$$V(t)=0+f(200, [\text{cars: 20, AFP: 15, efficiency standards: 10, Barack Obama: 10, regulations: 5, auto industry: 5}])*e^{\wedge}(-t/\lambda)$$

where t=1, λ=1 (t, λ are represented in some unit of time) =>

V(t)=200*[cars: 20, AFP: 15, efficiency standards: 10, Barack Obama: 10, regulations: 5, auto industry: 5]#*e^(-1) =>

V(t)=[cars: 4000, AFP: 3000, efficiency standards: 2000, Barack Obama: 2000, regulations: 1000, auto industry: 1000]# *e^(-1).

For simplicity, in this example, e=2. Thus, e^(-1)-½. Therefore,

V(t)=[cars: 2000, AFP: 1500, efficiency standards: 1000, Barack Obama: 1000, regulations: 500, auto industry: 500]#

Now, the user profile vector V may be computed. Recall that user profile vector V=V(t)*α+V(t−1)*(1−α), and α=0.7. V(t−1) is the user profile vector computed for time t=T1. Therefore, $$V=V(T2)*0.7+V(T1)*0.3 \Rightarrow$$

V=0.7*[cars: 2000, AFP: 1500, efficiency standards: 1000, Barack Obama: 1000, regulations: 500, auto industry: 500]#+0.3*[James Frey: 1250, Oprah Winfrey: 1000, Reuters: 1000, memoir: 875, Vanity Fair: 250, revelations: 125]=>

V=[cars: 1400, AFP: 1050, efficiency standards: 700, Barack Obama: 700, regulations: 350, auto industry: 350]#+[James Frey: 375, Oprah Winfrey: 300, Reuters: 300, memoir: 262.5, Vanity Fair: 37.5, revelations: 37.5]

Hence, at time T2, the User seems to be interested the most in "cars," then in "AFP," and less in "James Frey" and "Oprah Winfrey," while "revelations" remains at the bottom of the User's interests list.

At time T3, User initiates action of type B and accesses page P3. This can be represented as:

$$T3:B\rightarrow P3, V(t)=f(P(d),A,D(u))+N*e^{\wedge}(-t/\lambda)$$

Therefore, V(t) for the action initiated at time T3 is computed as follows:
V(t)=f(100, [Movies: 100, The Hunt for Red October: 70, Trailers: 50, Showtimes: 50, Premiere Photos: 50, Paramount Pictures: 40, Critics Reviews: 40])+[0]# =>

V(t)=100*[Movies: 100, The Hunt for Red October: 70, Trailers: 50, Showtimes: 50, Premiere Photos: 50, Paramount Pictures: 40, Critics Reviews: 40]=>

V(t)=[Movies: 10000, The Hunt for Red October: 7000, Trailers: 5000, Showtimes: 5000, Premiere Photos: 5000, Paramount Pictures: 4000, Critics Reviews: 4000]

The updated user profile vector, reflecting the information from the user interests vector updated at time T3, may be computed as follows:

$$V=V(t)*\alpha+V(t-1)*(1-\alpha), \alpha=0.7 \Rightarrow$$

V=0.7*[Movies: 10000, The Hunt for Red October: 7000, Trailers: 5000, Showtimes: 5000, Premiere Photos: 5000, Paramount Pictures: 4000, Critics Reviews: 4000]+0.3*([cars: 1400, AFP: 1050, efficiency standards:700, Barack Obama: 700, regulations: 350, auto industry: 350]#e^(-t/λ)+[James Frey: 375, Oprah Winfrey: 300, Reuters: 300, memoir: 262.5, Vanity Fair: 37.5, revelations: 37.5])

Substitute t=2. Thus,
V=[Movies: 7000, The Hunt for Red October: 4900, Trailers: 3500, Showtimes: 3500, Premiere Photos: 3500, Paramount Pictures: 2800, Critics Reviews: 2800, James Frey: 112.5, Oprah Winfrey: 90, Reuters: 90, memoir: 78.75, Vanity Fair: 11.25, revelations: 11.25]+[cars: 105, AFP: 78.75, efficiency standards: 52.5, Barack Obama: 52.5, regulations: 26.25, auto industry: 26.25]#

Hence, at time T3, the User seems to be interested the most in "Movies" and in particular in "The Hunt for Red October." Moreover, note that at time T3 the User is more interested in "Movies" and "The Hunt for Red October" than in "cars," and "AFP," which interested the User the most at time T2. Furthermore, note that "cars" and "AFP," which were more interesting to the User at time T2 than "James Frey" and "Oprah Winfrey," now are less important to the User. This can be explained by pointing out that the action that the User performed at T2 indicated rather the User's curiosity, than the User's long term interests. Therefore, the curiosity expressed by the User at time T2 may be considered a "short-time" interest, and thus its contribution to the User long term profile vanishes quicker than the long term interests that the User expressed at time T1, and certainly at time T3. The curiosity interests are waning quicker than the long term interests.

As the User initiates additional actions and visits other web pages, the information about those actions and pages maybe incorporated to update the user interest vector and then the user profile vector.

Note also that although this example defined only four types of action and four different web pages, additional action types and addition web pages may be incorporated in illustrating how the user interest vector and the user profile vector are computed.

Matching Documents to the User Interest

This example illustrates how knowing the user's interests may be helpful in selecting the documents that might be interesting to the user. In particular, this example illustrates how the user profile vector may be used in determining in which documents that are ready to be displayed to the user, the user might be interested the most.

In this example, there are three documents that can be displayed to the user. These documents are named D1, D2 and D3. The objective is to determine in which of the D1, D2 or D3 the user might be interested the most and in which of them the user might be interested the least.

Furthermore, assume that document D1 is represented using the following prisma vector:

[Barack Obama: 10, Movies: 20, Showtimes: 50, Dark Knight: 50]

D2 is represented using the following prisma vector:

[Oprah Winfrey: 20, efficiency standards: 30, ratings: 30, cars: 10]

D3 represented using the following prisma vector:

[Space Shuttle: 50, Hubble: 30, NASA: 10]

Relevance of documents to the user's interests may be determined using a "dot-product" of two vectors.

The dot-product of two vectors, also known as a scalar product, is an operation which takes two vectors, defined in the space of real numbers, and returns a real-valued scalar quantity. In particular, the dot product of two vectors $a=[\alpha_1, \alpha_2, \ldots, \alpha_n]$ and $b=[b_1, b_2, \ldots, b_n]$ is defined as:

$$a \cdot b = \sum_{i=1}^{n} a_i b_i = a_1 b_1 + a_2 b_2 + \cdots + a_n b_n$$

where $\Sigma$ denotes a summation notation and n is the dimension of the vectors.

In the Euclidean geometry, the dot product of vector a and vector b is defined as:

$$a \cdot b = |a| \, |b| \cos \theta$$

where |a| and |b| denote the corresponding lengths of a and b and $\theta$ is the angle between a and b.

This equation may be rewritten as follows:

$$\cos \theta = \frac{a \cdot b}{\|a\| \|b\|}.$$

If vectors a and b are orthogonal to each other, and each of the vectors a and b has the length of one, the cosine of the angle between a and b is zero, and the dot product of a and b is also zero. On the other hand, if vectors a and b are parallel to each other, and each of the vectors a and b has the length of one, the cosine of the angle between a and b is one, and the dot product of a and b is also one. Therefore, by computing the cosine between the vectors a and b, the angle between the vectors a and b can be determined.

If the vectors a and b are orthogonal, even if any of the vectors a and b has the length other than one, the dot product of a and b is still zero and the cosine of the angle between the vectors a and b is zero. However, if the vectors a and b are not orthogonal (but the angle between them is less than 90 degrees and has a positive value), then the dot product of the vectors a and b is a positive value greater than 0. Therefore, for any two vectors a and b the larger the cosine of the angle between them is, the smaller the angle between them is.

Two vectors represent "similar" information if they are parallel to each other, and two vectors represent "dissimilar" information if they are orthogonal to each other. By computing the cosine of the angle between the vectors a and b, "similarity" or "dissimilarity" of the contents represented by the respective vectors a and b can be determined.

In particular, if the cosine of the angle between the vectors a and b is zero, then the vectors represent "dissimilar" information. Thus, the larger the cosine of the angle between two vectors is, the more similar contents the vectors represent. T The term used to describe the similarity of two documents is a "cosine similarity." Therefore, for any two vectors a and b, the larger the cosine of the angle between them is, the more similar contents they represent. By corollary, the smaller the cosine of the angle between them is, the more dissimilar contents they represent.

Since the content of a document may be represented by a vector, and the overall user's interest may also be represented by a vector, the similarity between a document ready to be displayed to the user and the user's interests may be determined by computing a cosine of the angle between these two vectors.

In this example, the document's content is represented by the prisma vector described above, and the user's interests are represented by the user profile vector V, also described above.

The objective of the computations below is to determine how closely a document's prisma vector matches the user profile vector V, i.e. to compute the cosine similarity between the document's prisma vector and the user profile vector V.

The equation $$\cos \theta = \frac{\langle a, b \rangle}{\|a\| \|b\|}.$$

can be rewritten by substituting the document's prisma vector for vector a and by substituting the user profile vector V for vector b.

The cosine similarity values with respect to the user profile vector V, and document D1, document D2 and document D3, respectively, are computed below. In the computations below, the '.' symbol represent the dot product of two vectors.

Computing the cosine similarity for D1:

D1. V/(|D|*|V|)

=[Barack Obama: 10, Movies: 20, Showtimes: 50, Dark Knight: 50]. ([Movies: 7000,The Hunt for Red October: 4900, Trailers: 3500, Showtimes: 3500, Premiere Photos: 3500, Paramount Pictures: 2800, Critics Reviews: 2800, James Frey: 112.5, Oprah Winfrey: 90, Reuters: 90, memoir: 78.75, vanity Fair: 11.25, revelations: 11.25]+[cars: 105, AFP: 78.75, efficiency standards: 52.5, Barack Obama: 52.5, regulations: 26.25, auto industry: 26.25]#)

=[Barack Obama: 525, Movies: 140000, Showtimes: 175000]/(sqrt (100+400+2500+2500)*sqrt (49*10^6+2401*10^04+1225*10^4+1225*10^4+ 784*10^4+784*10^4+12656.25+8100+8100+ 6201.5625+126.5625+126.5625+689.0625+11025+ 689.0625+2756.25+2756.25+6201.5625)

=[Barack Obama: 525, Movies: 140000, Showtimes: 175000]/(74.16198* 352.32105387)

=[Barack Obama: 525, Movies: 140000, Showtimes: 175000]/26128.826950685863

=[Barack Obama: 0.0200927504702, Movies: 5.35806679206, Showtimes: 6.69758349008]

Modulus of this vector, i.e. the cosine of the angle between D1 and V=8.577115370180687.

Computing the cosine similarity for D2:
D2. V/(|D|*|V|)
=[Oprah Winfrey: 20, efficiency standards: 30, ratings: 30, cars: 10]. ([Movies: 7000, The Hunt for Red October: 4900, Trailers: 3500, Showtimes: 3500, Premiere Photos: 3500, Paramount Pictures: 2800, Critics Reviews: 2800, James Frey: 112.5, Oprah Winfrey: 90, Reuters: 90, memoir: 78.75, Vanity Fair: 11.25, revelations: 11.25]+[cars: 105, AFP: 78.75, efficiency standards: 52.5, Barack Obama: 52.5, regulations: 26.25, auto industry: 26.25]#)
=[Oprah Winfrey: 1800, efficiency standards: 1575, cars: 1050]/(sqrt (400+900+900+100)*sqrt (49*10^6+ 2401*10^4+1225*10^4+1225*10^4+784*10^4+ 784*10^4+12656.25+8100+8100+6201.5625+ 126.5625+126.5625+689.0625+11025+689.0625+ 2756.25+2756.25+6201.5625)
=[Oprah Winfrey: 1800, efficiency standards: 1575, cars: 1050]/(47.958315233127195*352.32105387)
=[Oprah Winfrey: 0.10652952503974485, efficiency standards: 0.093213334409776735, cars: 0.062142222939851159]
Modulus of this vector=0.15459275949697207.
Computing the cosine similarity for D3:
D3.V/(|D|*|V|)=[Space Shuttle: 50, Hubble: 30, NASA: 10]. ([Movies: 7000, The Hunt for Red October: 4900, Trailers: 3500, Showtimes: 3500, Premiere Photos: 3500, Paramount Pictures: 2800, Critics Reviews: 2800, James Frey: 112.5, Oprah Winfrey: 90, Reuters: 90, memoir: 78.75, Vanity Fair: 11.25, revelations: 11.25]+ [cars: 105, AFP: 78.75, efficiency standards: 52.5, Barack Obama: 52.5, regulations: 26.25, auto industry: 26.25]#)=[ ]
Modulus of this vector=0.
According to the above computations, the respective (rounded to two digits) cosine values were: "8.5" for D1, "0.1" for D2, and "0" for D3.
As noted above, the larger the cosine value of the angle between two vectors is, the more similar contents the vectors represent. Therefore, D1 would be most interesting to the user followed by D2 and then D3.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
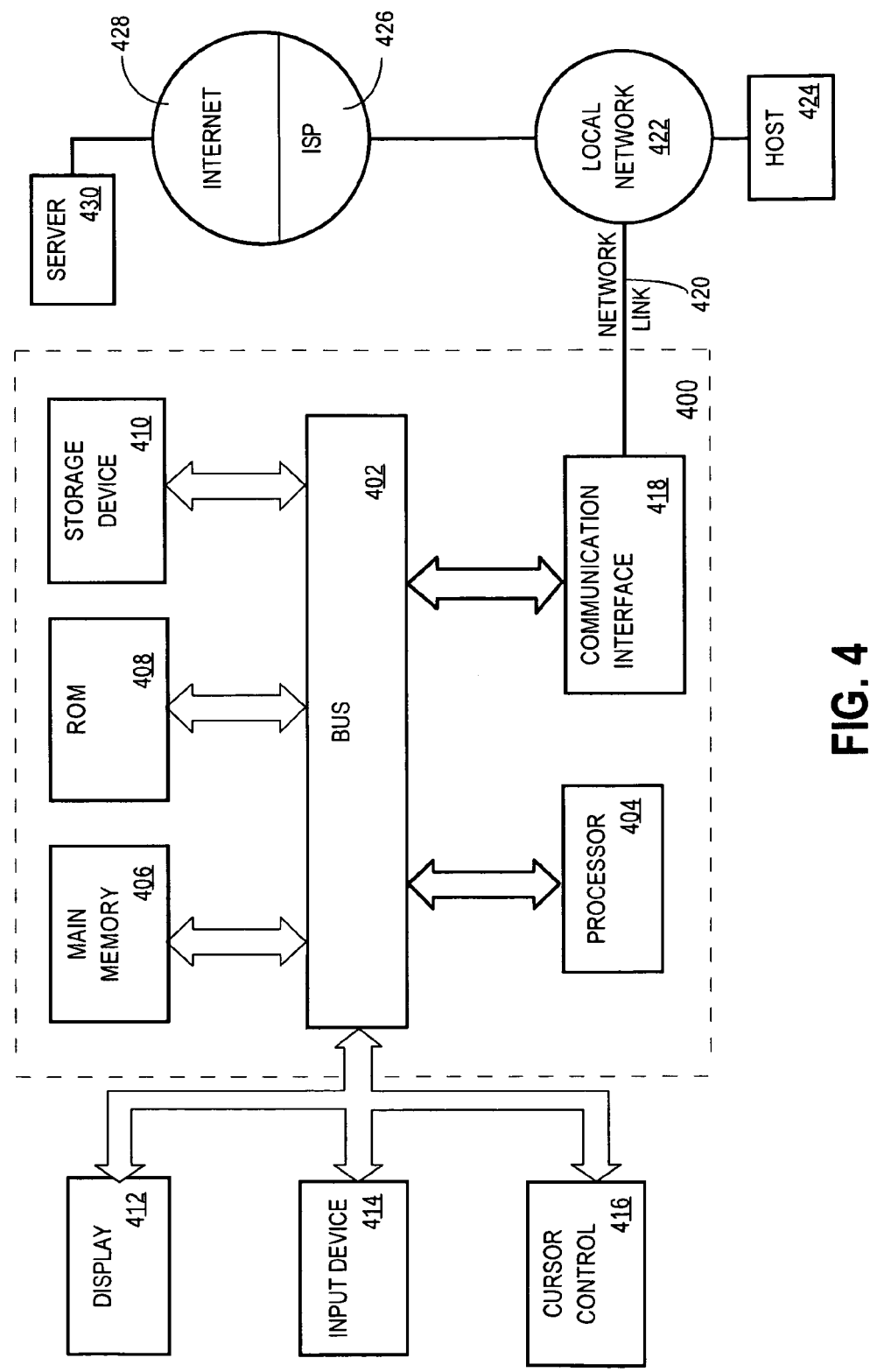
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    monitoring actions performed by a user that is associated with a profile target;
    wherein said profile target comprises a group that includes at least two users;
    maintaining, for said group, a profile that includes particular data that reflects a cumulative representation of interests that said group has had in each subject of a particular set of one or more subjects;
    detecting that said user performed a particular action associated with a particular content;
    wherein said particular content is related to said particular set of said one or more subjects;
    wherein each subject, of said particular set of said one or more subjects, has, for said particular content, a corresponding subject weight value;
    wherein, for said particular content, said corresponding subject weight value for each subject indicates how related said particular content is to said corresponding subject of said particular set of said one or more subjects;
    in response to said user performing said particular action associated with said particular content, performing said steps of:
        determining a particular action type of said particular action, wherein said particular action type of said particular action is one of a plurality of action types;
        determining, for said user, one or more interest weights for said particular set of said one or more subjects based, at least in part, on:
            one or more subject weight values, for said particular content, that correspond to said particular set of said one or more subjects, an action type weight determined for said particular action type of said particular action, and at least one demographic characteristic of said user;
        updating said particular data in said profile associated with said group based, at least in part, on said one or more interest weights for said particular set of said one or more subjects determined for said user;
        wherein said step of updating is performed by one or more computing devices.

2. The method of claim 1, wherein said determining said one or more interest weights for said particular set of said one or more subjects is based, at least in part, on whether said user was interested in any of said one or more subjects in said particular set of said one or more subjects in the past.

3. The method of claim 1, wherein said determining said one or more interest weights for said particular set of said one or more subjects is based, at least in part, on whether said particular action is associated with a long term interest.

4. The method of claim 1, wherein said determining said one or more interest weights for said particular set of said one or more subjects is based, at least in part, on whether any user associated with said profile target was interested in any of said subjects in said particular set of said one or more subjects in the past.

5. The method of claim 1, wherein said updating said particular data in said profile associated with said group further comprises applying a decay function to said one or more interest weights for said particular set of said one or more subjects.

6. The method of claim 1, wherein said user has one or more associated demographic characteristics that are specific to said profile target.

7. The method of claim 6, wherein said updating said particular data in said profile associated with said group further comprises modifying said one or more interest weights for said particular set of said one or more subjects based on said one or more demographic characterstics associated with said user.

8. One or more non-transitory storage media storing instructions which, when executed by one or more computing devices, cause performance of steps comprising:
    monitoring actions performed by a user that is associated with a profile target;
    wherein said profile target comprises a group that includes at least two users;
    maintaining, for said group, a profile that includes particular data that reflects a cumulative representation of interests that said group has had in each subject of a particular set of one or more subjects;
    detecting that said user performed a particular action associated with a particular content;
    wherein said particular content is related to said particular set of said one or more subjects;
    wherein each subject, of said particular set of said one or more subjects, has, for said particular content, a corresponding subject weight value;
    wherein, for said particular content, said corresponding subject weight value for each subject indicates how related said particular content is to said corresponding subject of said particular set of said one or more subjects;
    in response to said user performing said particular action associated with said particular content, performing said steps of:
        determining a particular action type of said particular action, wherein said particular action type of said particular action is one of a plurality of action types;
        determining, for said user, one or more interest weights for said particular set of said one or more subjects based, at least in part, on:
            one or more subject weight values, for said particular content, that correspond to said particular set of said one or more subjects, an action type weight determined for said particular action type of said particular action, and at least one demographic characteristic of said user;
        updating said particular data in said profile associated with said group based, at least in part, on said one or more interest weights for said particular set of said one or more subjects determined for said user.

9. The one or more non-transitory storage media of claim 8, wherein instructions which cause performance of said determining said one or more interest weights for said particular set of said one or more subjects further comprise instructions which, when executed, cause performance of said determining based, at least in part, on whether said user was interested in any of said one or more subjects in said particular set of said one or more subjects in the past.

10. The one or more non-transitory storage media of claim 8, wherein said instructions which cause performance of said determining said determining said one or more interest weights for said particular set of said one or more subjects further comprise instructions, which, when executed, cause performance of said determining based, at least in part, on whether said particular action is associated with a long term interest.

11. The one or more non-transitory storage media of claim 8, wherein said instructions which cause performance of said determining said one or more interest weights for said particular set of said one or more subjects further comprise instructions which, when executed, cause performance of said determining based, at least in part, on whether any user associated with said profile target was interested in any of said subjects in said particular set of said one or more subjects in the past.

12. The one or more non-transitory storage media of claim 8, wherein said instructions which cause performance of said updating said particular data in said profile associated with said group further comprise instructions which, when executed, cause performance of steps comprising applying a decay function to said one or more interest weights for said particular set of said one or more subjects.

13. The one or more non-transitory storage media of claim 8, wherein said user has one or more associated demographic characteristics that are specific to said profile target.

14. The one or more non-transitory storage media of claim 13, wherein said instructions which cause performance of said updating said particular data in said profile associated with said group further comprise instructions which, when executed, cause performance of steps comprising: modifying said one or more interest weights for said particular set of said one or more subjects based on said one or more demographic characteristics associated with said user.

15. A method comprising:
    monitoring actions performed by a user that is associated with a profile target;
    wherein said profile target comprises a group that includes a plurality of users;
    maintaining, for said group, a profile that includes particular data that reflects a cumulative representation of interests that said group has had in each subject of a particular set of one or more subjects;
    detecting that said user performed a particular action associated with a particular content;
    wherein said particular content is related to said particular set of said one or more subjects;
    in response to said user performing said particular action associated with said particular content, performing said steps of:
        determining a particular action type of said particular action, wherein said particular action type of said particular action is one of a plurality of action types;
        determining, for said user, one or more interest present values for said particular set of said one or more subjects based, at least in part, on:
            one or more subject weight values, for said particular content, that correspond to said particular set of said one or more subjects,
            wherein, for said particular content, a corresponding subject weight value for each subject indicates how related said particular content is to said corresponding subject of said particular set of said one or more subjects, an action type weight determined for said particular action type, and at least one demographic characteristic of said user;
        wherein said one or more interest present values indicate how much interest said user presently has in each subject of said particular set of said one or more subjects, identified for said particular content;
        determining at least two interest past values for said particular set of said one or more subjects, identified in said particular content;
        wherein said at least two interest past values indicate how much interest at least two users, of said plurality of users, previously had in each subject of said particular set of said one or more subjects;
        updating, said particular data in said profile associated with said group of said plurality of users, based, at least in part, on said one or more interest present values and said at least two interest past values;

wherein said step of said updating is performed by one or more computing devices programmed to be special purpose machines pursuant to program instructions.

16. The method of claim 15, wherein said updating, said particular data in said profile associated with said group of said plurality of users further comprises applying a decay function to one or more of said at least two interest past values for said particular set of said one or more subjects.

* * * * *